United States Patent
Bailey et al.

(10) Patent No.: US 7,337,258 B1
(45) Date of Patent: Feb. 26, 2008

(54) DYNAMICALLY ALLOCATING DEVICES TO BUSES

(75) Inventors: Robert L Bailey, Watsonville, CA (US); Brian D Howard, Portola Valley, CA (US); Lesley B Wynne, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 10/823,155

(22) Filed: Apr. 12, 2004

(51) Int. Cl.
  *G06F 13/36* (2006.01)
  *G06F 1/26* (2006.01)
  *G06F 1/32* (2006.01)
  *H04L 12/40* (2006.01)
  *H04J 3/16* (2006.01)
  *G06F 3/01* (2006.01)
  *G06F 12/02* (2006.01)

(52) U.S. Cl. .................. 710/305; 710/107; 710/316; 711/147; 718/105; 713/320

(58) Field of Classification Search ................ 710/305, 710/306, 107, 309, 316; 713/300, 320; 714/47; 709/235, 239, 240; 370/420, 437, 354, 229, 370/235, 237; 711/147; 718/105
See application file for complete search history.

(56) References Cited

U.S. PATENT DOCUMENTS

| | | | | |
|---|---|---|---|---|
| 4,263,649 A | * | 4/1981 | Lapp, Jr. | 710/107 |
| 5,253,248 A | * | 10/1993 | Dravida et al. | 370/228 |
| 5,327,538 A | * | 7/1994 | Hamaguchi et al. | 710/107 |
| 5,404,462 A | * | 4/1995 | Datwyler et al. | 713/600 |
| 5,430,729 A | * | 7/1995 | Rahnema | 370/409 |
| 5,551,007 A | * | 8/1996 | Miyazaki et al. | 711/148 |
| 5,636,361 A | * | 6/1997 | Ingerman | 711/150 |
| 5,771,366 A | * | 6/1998 | Bjorksten et al. | 712/217 |
| 5,799,161 A | * | 8/1998 | Merrick | 710/305 |
| 5,838,931 A | * | 11/1998 | Regenold et al. | 710/306 |
| 6,618,777 B1 | * | 9/2003 | Greenfield | 710/120 |
| 6,674,750 B1 | * | 1/2004 | Castellano | 370/354 |
| 6,744,984 B1 | * | 6/2004 | Faruque et al. | 398/57 |
| 6,831,895 B1 | * | 12/2004 | Ji et al. | 370/237 |
| 2002/0059491 A1 | * | 5/2002 | Date et al. | 710/240 |
| 2007/0050653 A1 | * | 3/2007 | Verdun | 713/320 |

OTHER PUBLICATIONS

"Hardware evaluation of low power communication mechanism for transport-triggerd architectures" by Pointeck et al. (abstract only) Publication Date: Jun. 9-11, 2003.*

* cited by examiner

*Primary Examiner*—Gopal C. Ray
(74) *Attorney, Agent, or Firm*—Fenwick & West LLP

(57) ABSTRACT

Devices are assigned to different buses at development time as well as dynamically during operation, based on actual performance. At development time, bus assignment can be determined based on experiments and direct observation of how devices behave in various configurations. At run time, load on each bus is preferably measured periodically, and when it is uneven, devices are reallocated to different buses. In an alternative embodiment, a user can specify a preference for using more or fewer buses in order to optimize operation for efficiency or lower power consumption.

11 Claims, 5 Drawing Sheets

DYNAMICALLY ALLOCATING DEVICES TO BUSES

BACKGROUND OF THE INVENTION

1. Field of the Invention

The invention relates generally to computer system architectures and, more particularly, to a system and method of assigning devices to one of multiple buses based on performance criteria.

2. Description of the Related Art

In many computer designs multiple devices share resources provided by multiple buses or other groups of signals. In each design, an engineer must make tradeoffs in deciding how many buses to provide and how best to apportion the devices among those buses. These decisions are typically based on: a) estimates of how the bus activity generated by the presence of each device on a bus will fit into the overall bandwidth and other features available on that bus (typically based on experience and/or simulations); b) how that activity will affect the operation of other devices on that bus; and c) how the apportioned bus activity will affect performance and power consumption. Once the devices have been assigned to their respective buses, the configuration is fixed for that design.

Problems can arise, however, when software begins running on the resulting system. A device may turn out to have characteristics that adversely affect the operation of other devices sharing its bus, such as long latencies, taking over the bus for long periods of time, or generating unexpectedly large amounts of bus traffic. An application may make intensive use of two devices that share a bus, such that the two devices and their bus activity interfere with each other in unexpected ways. It may turn out that most of the devices are not used most of the time, but the few that are used are apportioned among the buses such that all the buses must remain active all the time, consuming unnecessary power.

Because the characteristics of devices and software applications change with different versions and different uses, and because new software applications and consumer usage patterns may emerge during the life of the system, the ultimate best assignment of devices to the buses may not be the assignment fixed upon during the design phase of the project.

Accordingly, there is a need for a computer system and method that enables the assignment of devices to multiple buses based on actual performance criteria. Such assignment should be available during development based on experiments and observations of device behavior in various configurations, and dynamically based on load, bus traffic, retry activity, power savings and other factors. Additionally, assignment should also be available based on user preference.

SUMMARY OF THE INVENTION

The present invention enables assignment of devices to different buses at development time as well as dynamically during operation, based on actual performance. At development time, bus assignment can be determined based on experiments and direct observation of how devices behave in various configurations. At run time, load on each bus is preferably measured periodically, and when it is uneven, devices are reallocated to different buses. In an alternative embodiment, a user can specify a preference for using more or fewer buses in order to optimize operation for efficiency or lower power consumption.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Bus Switch System

Figure 1:
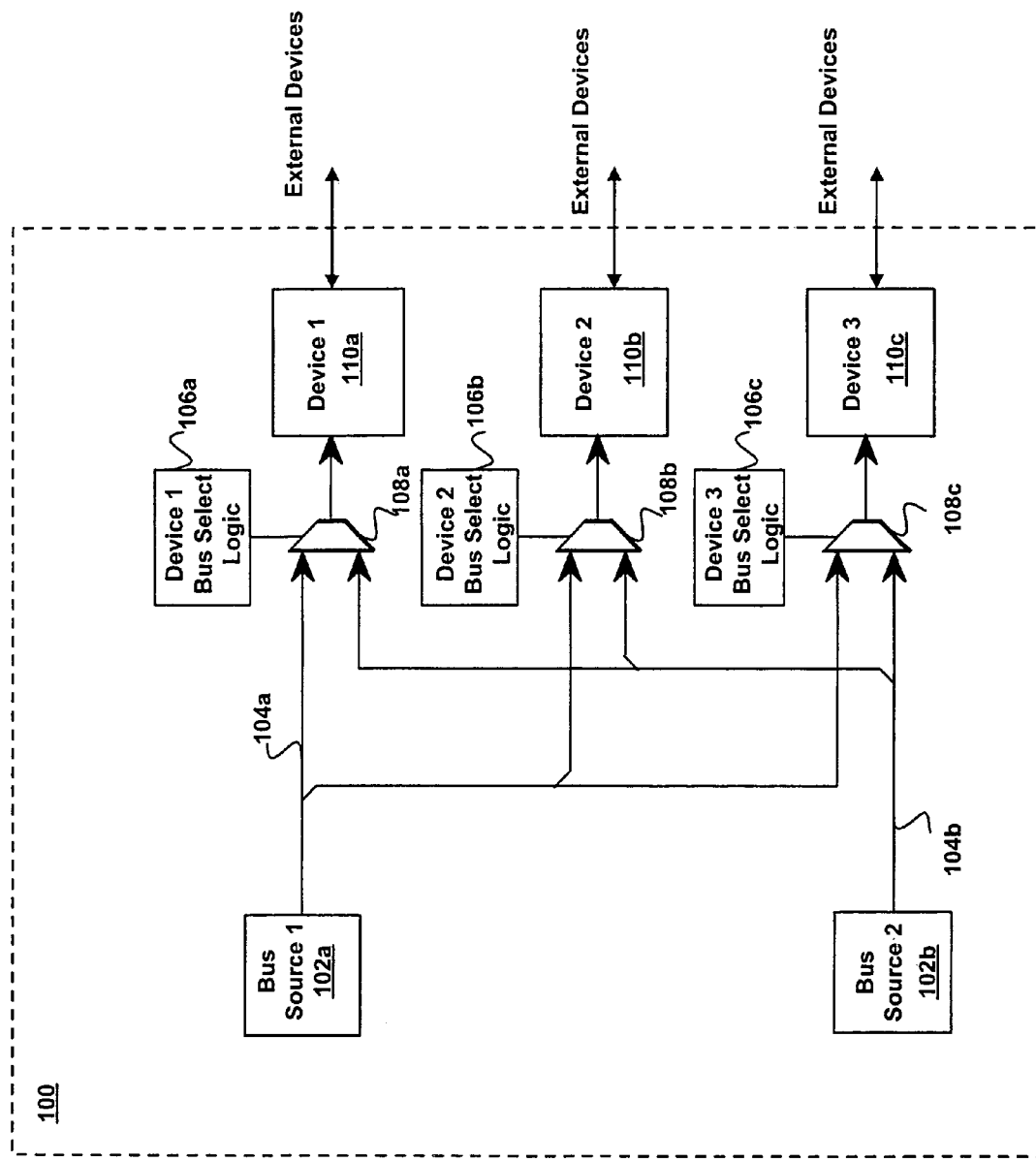
FIG. 1 is a block diagram illustrating switched outputs to devices, in accordance with one embodiment of the present invention.

FIG. 1 is a block diagram illustrating a bus switch system 100 having switched outputs to devices in accordance with one embodiment of the present invention. The bus switch system 100 includes bus sources 102*a* and 102*b*, buses 104*a* and 104*b*, bus select logic 106*a*, 106*b* and 106*c*, switches 108*a*, 108*b* and 108*c* and devices 110*a*, 110*b* and 110*c*. In one embodiment of the present invention, the bus switch system 100 is part of one or more bridges (e.g., PCI bridge) in an input/output (I/O) controller in a computer system (e.g., personal computer).

The present invention is not limited to assignment of buses to I/O devices. Rather, the present invention is also applicable to assignment of memory elements in a chip to one or more buses based on the memory requirements of an application or task. Also, multiple processors on a die can be switched into different groupings to one or more buses depending on the resource requirements of software threads, algorithms and/or the like. Traffic in a switched fabric of buses can also be adjusted periodically to optimize throughput or power consumption.

The specific configurations described here and shown in the figures are example embodiments of the present invention. Other configurations are possible, including configurations having more or fewer bus sources, buses, bus select logic, switches and devices.

Referring still to FIG. 1, bus sources 102*a* and 102*b* are coupled to the devices 110*a*, 110*b* and 110*c* via the switches 108*a*, 108*b* and 108*c*. The bus sources 102*a* and 102*b* (e.g., processor, memory) provide various data and/or other information to at least one of the devices 110*a*, 110*b* and 110*c* depending on the respective states of the switches 108*a*, 108*b* and 108*c*. Buses 104*a* and 104*b* can be any type of internal bus, including but not limited to Peripheral Component Interconnect (PCI) buses, well known in the art. The devices 110*a*, 110*b* and 110*c* can be any kind of device, including but not limited to a device controller, FireWire™, UATA, SATA, USB and Ethernet devices. The devices 110*a*, 110*b* and 110*c* may be adapted to connect to external devices. A variety of switches 108*a*, 108*b* and 108*c* can be used with the present invention including conventional 2:1 and 1:2 CMOS switches shown in FIGS. 1 and 2.

Bus Assignment During Development

Bus select logic 106a, 106b and 106c are used to control the states of the switches 108a, 108b and 108c, respectively. Depending upon the desired bus assignment, each of the switches 108a, 108b and 108c passes data from bus 104a or bus 104b to devices 110a, 110b and 110c. In one embodiment, the bus select logic 106a, 106b and 106c are implemented as one or more registers containing one or more bits indicative of the states of the switches 108a, 108b and 108c. For example in the embodiment illustrated in FIG. 1, a register contains three bits. Each bit is assigned to one of the switches 108a, 108b and 108c and has one of two possible logic values: "0" and "1." If the most significant bit is "0", then traffic from bus 104a is passed through switch 108a to device 110a. If the most significant bit is "1", the traffic from bus 104b will be passed through switch 108a to device 110a. The same logic can be applied to switches 108b and 108c. Table 1 below illustrates one example of bus assignments for the configuration shown in FIG. 1.

TABLE 1

Bus Assignments

| Register Bits | BUS SOURCE | DEVICE |
|---|---|---|
| 000 | 1 | 1, 2, 3 |
|  | 2 | N/A |
| 001 | 1 | 1, 2 |
|  | 2 | 3 |
| 010 | 1 | 1, 3 |
|  | 2 | 2 |
| 011 | 1 | 1 |
|  | 2 | 2, 3 |
| 100 | 1 | 2, 3 |
|  | 2 | 1 |
| 101 | 1 | 2 |
|  | 2 | 1, 3 |
| 110 | 1 | 3 |
|  | 2 | 1, 2 |
| 111 | 1 | N/A |
|  | 2 | 1, 2, 3 |

Thus, for example, if the value of the bits in the register is "101" then device 2 110b receives data from bus source 1 102a, while devices 1 and 3 110a, 110c receive data from bus source 2 102b.

During development, the register bits can be determined based on experiments and observations of how the devices 110a, 110b and 110c and buses 104a and 104b behave with different configurations. Thus, the register bits can advantageously determine selection of a particular bus for connection with each device before the bus and its associated devices are enumerated. The register bit values can be loaded in a single register coupled to the switches 108a, 108b and 108c or, alternatively, each switch 108a, 108b and 108c can be coupled to its own register. The registers can be loaded automatically during, for example, system boot-up or from disk or downloaded from a network. In one embodiment, the register bits are selected via a system configuration file or user interface designed for such purpose.

Figure 2:
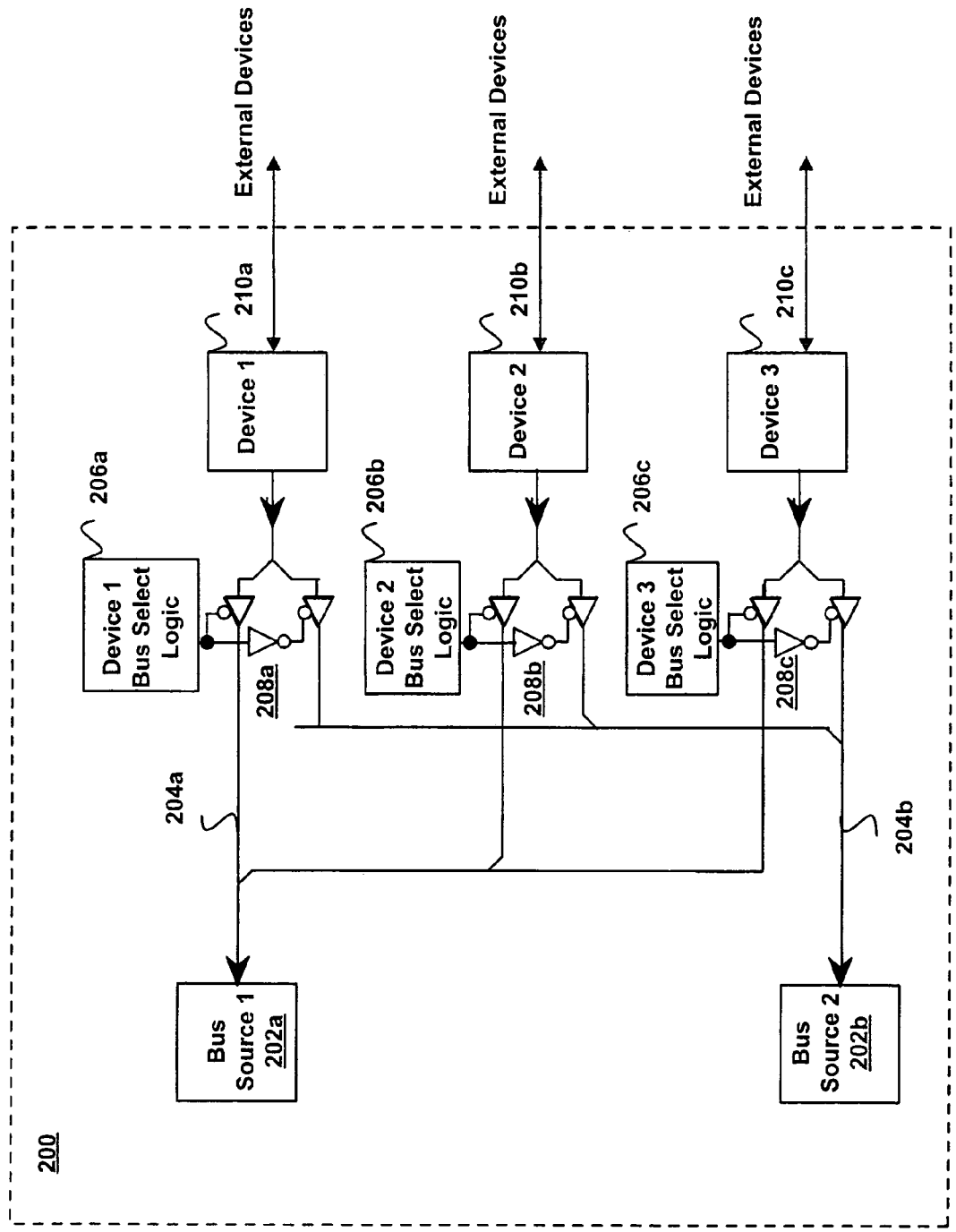
FIG. 2 is a block diagram illustrating switched inputs to devices, in accordance with one embodiment of the present invention.

FIG. 2 is a block diagram illustrating switched inputs to devices, in accordance with one embodiment of the present invention. Buses 204a and 204b are coupled to bus sources 202a and 202b, respectively. Input data and other information generated by external devices are received by devices 210a, 210b and 210c. Bus selection logic 206a, 206b and 206c are coupled to three-state buffers 208a, 208b and 208c, respectively, to select which of buses 204a and 204b will receive the traffic. Note that the depiction of buffers 208a, 208b and 208c and muxes 108a, 108b and 108c in FIG. 1 is meant to illustrate that any suitable logic device can be used to route information to the selected bus.

Here again, in a preferred embodiment each bit in a register is assigned to one of the switches 208a, 208b and 208c. If the most significant bit is "0", then traffic from device 210a is passed through switch 208a onto bus 204a and to bus source 1 202a. If the most significant bit is "1", the traffic from device 210a will be passed through switch 208a onto bus 204b and to bus source 2 202b. Table 2 below illustrates one example of bus assignments for the configuration shown in FIG. 2.

TABLE 2

Bus Assignments

| Register Bits | DEVICE | BUS SOURCE |
|---|---|---|
| 000 | 1, 2, 3 | 1 |
|  | N/A | 2 |
| 001 | 1, 2 | 1 |
|  | 3 | 2 |
| 010 | 1, 3 | 1 |
|  | 2 | 2 |
| 011 | 1 | 1 |
|  | 2, 3 | 2 |
| 100 | 2, 3 | 1 |
|  | 1 | 2 |
| 101 | 2 | 1 |
|  | 1, 3 | 2 |
| 110 | 3 | 1 |
|  | 1, 2 | 2 |
| 111 | N/A | 1 |
|  | 1, 2, 3 | 2 |

Thus, for example, if the value of the bits in the register is "101" then bus source 1 202a receives data from device 2 210b, while bus source 2 202b receives data from devices 1 and 3 210a, 210c.

Dynamic Bus Assignment

Figure 3:
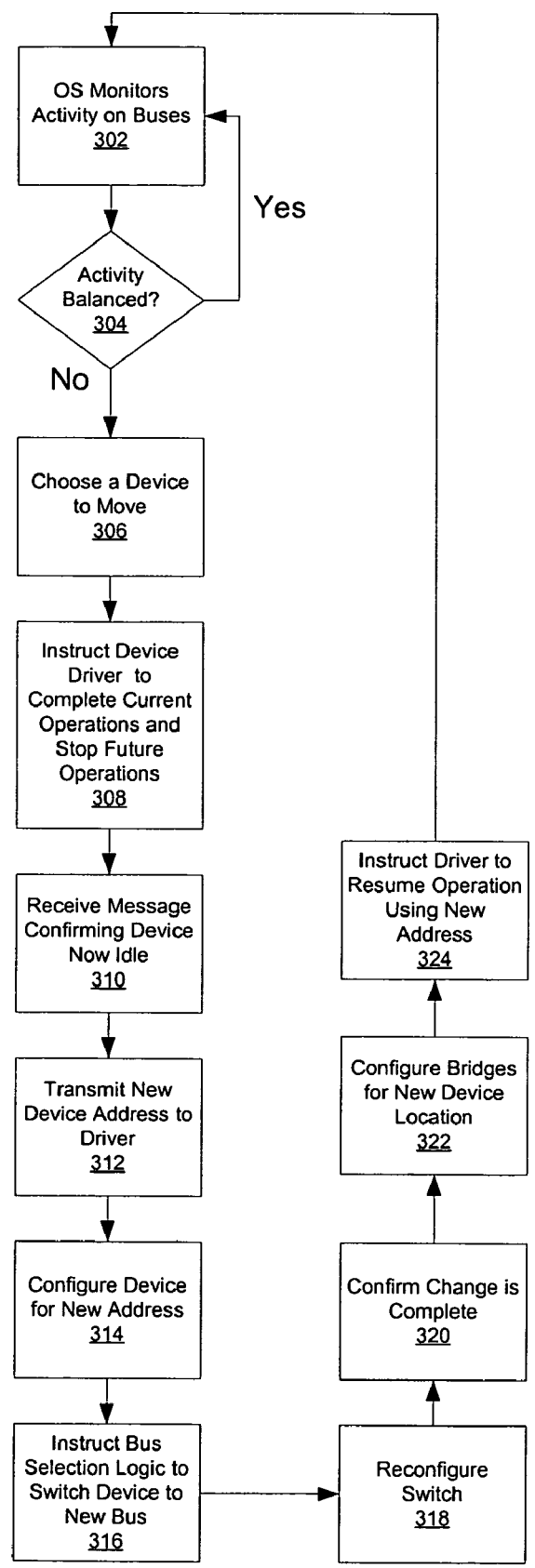
FIG. 3 is a flow chart illustrating a method for monitoring bus activity and reassigning a device to a different bus, in accordance with one embodiment of the present invention.

Referring now to FIG. 3, dynamic bus assignment in a preferred embodiment proceeds as follows. First, the operating system monitors 302 activity on buses 104a, 104b. Logic and a method for measuring bus activity are described below with respect to FIG. 4 and FIG. 5. If the bus activity is 304 balanced, the operating system returns to step 302 and checks the activity for balance again after a predetermined amount of time. In one embodiment, the OS is continually monitoring activity on the buses, while in alternative embodiments activity may be checked once a minute, once every five minutes, or at any other frequency determined to be appropriate. If the activity is not balanced, then the operating system chooses 306 a device 110 on a busier bus that should be moved to a more idle bus.

If the busier bus has only one device, moving the device to another bus will not increase performance. If the busier bus has more than one device, in a preferred embodiment, the operating system determines a ranking of which devices are generating the most bus traffic, for example by examining the frequency of updating DMA instructions. If the difference between traffic on two buses is small, then the device generating the least traffic on the busy bus is moved to the less busy bus. Alternatively, if the difference between traffic on the two buses is large, then the device generating the second most traffice is moved instead. Those of skill in the art will appreciate that where a bus has more devices, an optimal selection of a device to move can be made by selecting device that is the third-most-busy, fourth-most-busy, etc.

For this example, assume that the chosen devices 110a and 110c are currently on bus 104b, which is determined to be busier than bus 104a. Device 110a is determined to be generating less traffic than device 110c. Therefore, the operating system will choose to move device 110a from bus 104b to 104a. The operating system next tells 308 a driver for the chosen device, here device 110a, to complete any current operations underway and to stop all future operations. The operating system then waits to receive 310 a message from the driver indicating that the device is idle, and then transmits 312 to the driver the new address for the device. The operating system then configures 314 the device for its new address, at which point the device 110a will no longer respond on its original bus 104b. The operating system then instructs 316 the bus select logic 106a to switch the device 110a to the new bus, bus 104a. Bus selection logic 106a waits until both buses 104a, 104b are idle, and then reconfigures 318 switch 108a to indicate that device 110a is on bus 104a. Bus select logic 106a then sends 320 a message to the operating system indicating that the switch from bus 104b to 104a is complete. The operating system then configures 322 bus sources 102a, 102b for device 110a's new location, and instructs 324 the driver for device 110a to resume operation using the new address.

Figure 4:
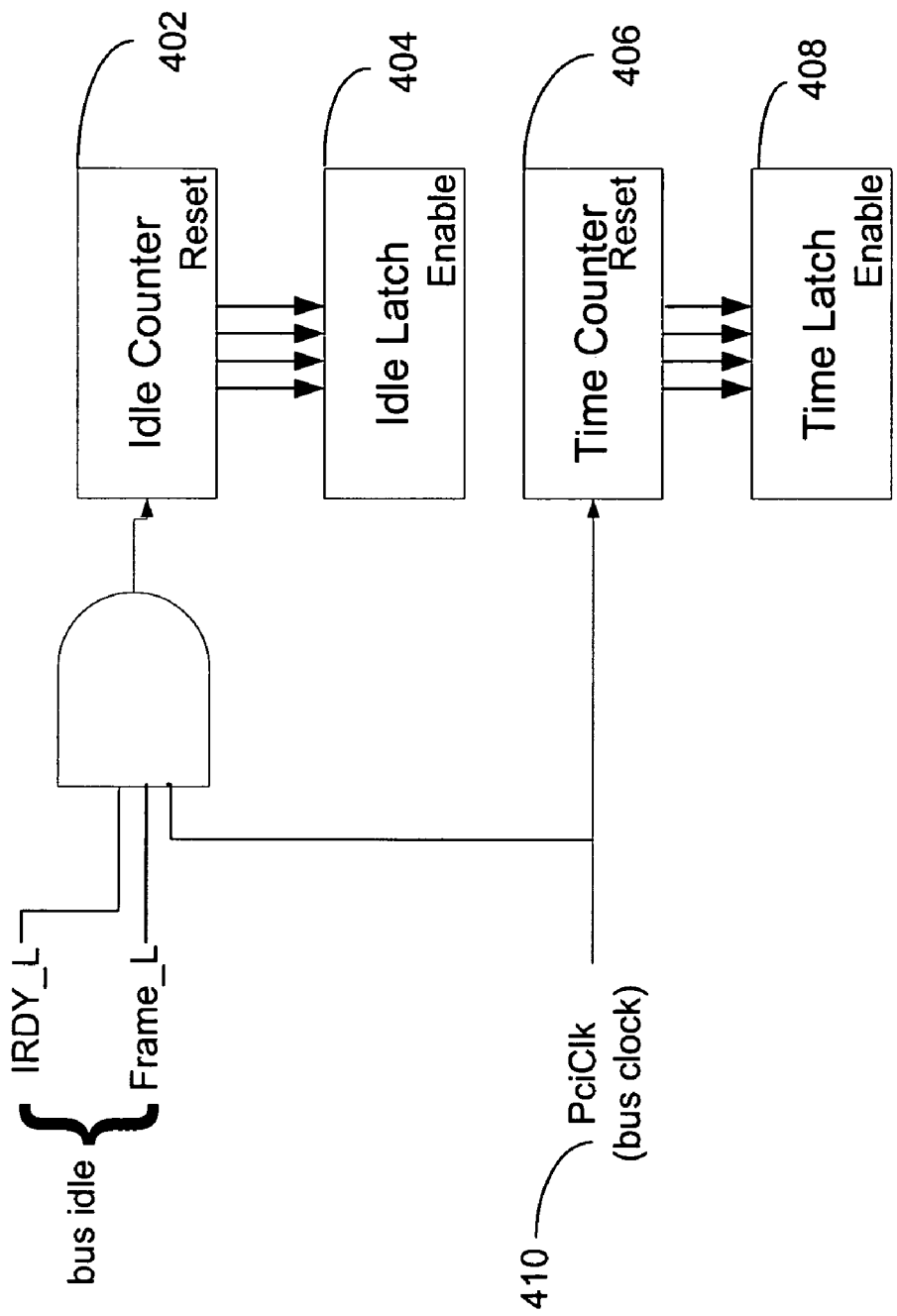
FIG. 4 is an illustration of logic for detecting bus activity in accordance with an embodiment of the present invention.

Referring now to FIG. 4, there is shown an illustration of a logic for detecting bus activity in accordance with an embodiment of the present invention. The example illustrated in FIG. 4 depicts a PCI bus, but other buses with other signaling schemes can also be used, as will be appreciated by those of skill in the art. FIG. 4 includes an idle counter 402 and idle latch 404; and a time counter 406 and time latch 408. Bus clock 410 runs constantly, and can be used as a way of counting time. Frame_L or IRDY_L are asserted (driven low) for the duration of any transaction on the bus. The time counter 406 counts the bus clock 410 at all times, while the idle counter 402 counts the bus clock 410 only when no bus transaction is taking place.

Figure 5:
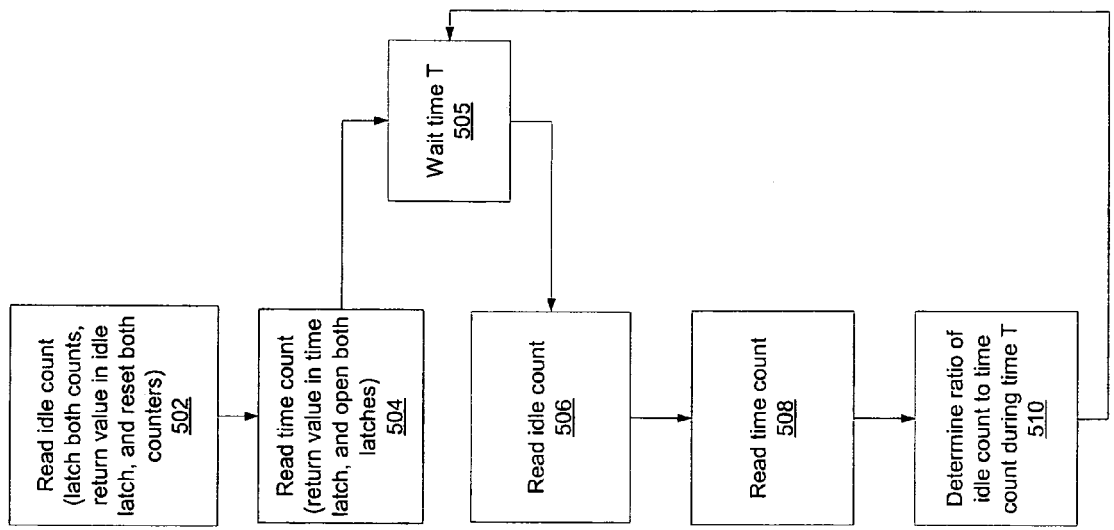
FIG. 5 is a flow chart illustrating a method for detecting bus activity in accordance with an embodiment of the present invention.

FIG. 5 illustrates a method for detecting bus activity using the logic illustrated in FIG. 4. First, the idle count is read 502, which latches both counts in latches 404, 408, returns the value in the idle latch 404, and then resets both counters 402, 406 with a pulse. Next, the time count is read 504, which returns the value in the time latch 408, and then opens both latches. The counters are now initialized. After waiting 505 some time interval, T, the operating system again reads 506 the idle count and 508 the time count as described above. A ratio of the idle count to the time count is determined 510, which gives the fraction of time the bus has been idle during the time interval T. T is preferably chosen such that counts are large enough to provide a meaningful indicator of average activity, but small enough that the time counter will not overflow. In one embodiment, steps 505-510 are repeated in a loop in order to provide constant monitoring of the system. In an alternative embodiment, once the buses are balanced, the loop terminates, and steps 502-510 are repeated at some periodic interval, such as one minute.

The ability to move devices dynamically between buses allows for a tradeoff to be made between system performance and power consumption. Allocating devices to different buses in order to balance the activity on each bus, as described above with reference to FIG. 3, improves system performance because the total available bus bandwidth across all the buses can be better exploited. On the other hand, since keeping a bus active requires additional power, turning off the clocks to the various bridges on an idle bus (or a bus that has been made idle by shifting all of its devices to other buses) reduces power consumption, which is useful for mobile and other power-sensitive users. The present invention allows dynamic shifting of devices between buses in order to suit the current environment of a user. For example, a user of a laptop computer that is plugged in to electrical power may favor system performance over decreased power consumption, but when she is no longer connected to an external power source, she may instead prefer the reverse. In a preferred embodiment, a user-changeable setting in the operating system allows the user to specify her preference for power consumption versus system performance. In one embodiment, this preference is expressed as a sliding scale, while in another embodiment, predefined profiles such as "Mobile user" or "Desktop user" can be selected from. Also in an alternative embodiment, the preferences can be adjusted at the BIOS level, instead of at the operating system level.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of bus selection logic 106 and so forth may be provided in many or one module.

Some portions of the above description present the features of the present invention in terms of algorithms and symbolic representations of operations on information. These algorithmic descriptions and representations are the means used by those skilled in the computer bus design arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for dynamically allocating a device to a bus, the method comprising:
    monitoring activity on a plurality of buses to determine an imbalance;
    responsive to a determined imbalance:
        automatically selecting a device from a plurality of devices to move from a first of the plurality of buses to a second of the plurality of buses; and
        configuring the device to communicate via the second bus.

2. The computer-implemented method of claim 1 wherein the determined imbalance includes greater activity on the first bus than on the second bus.

3. The computer-implemented method of claim 1 wherein the determined imbalance includes greater power consumption by the first bus than the second bus.

4. The method of claim 1 wherein automatically selecting the device to move from the first bus to the second bus further comprises:
    determining which device of the plurality of devices is generating a least amount of traffic on the bus; and
    selecting the determined device.

5. The method of claim 1 wherein automatically selecting the device to move from the first bus to the second bus further comprises:
    determining a ranking for each device according to an amount of traffic on the bus generated by the device; and
    selecting according to the rankings a device to move from the first bus to the second bus to reduce the imbalance.

6. A computer-implemented method for dynamically allocating a device to a bus, the method comprising:
    receiving a threshold imbalance level;
    monitoring activity on a plurality of buses to determine an imbalance;
    responsive to the determined imbalance exceeding the threshold imbalance level:
        automatically selecting a device to move from a first of the plurality of buses to a second of the plurality of buses; and
        configuring the device to communicate via the second bus.

7. The method of claim 6 wherein the threshold imbalance level is associated with a hardware profile.

8. The method of claim 7 wherein the hardware profile is a portable computer profile.

9. The method of claim 7 wherein the hardware profile is a desktop computer profile.

10. A computer-implemented method for dynamically allocating a device to a bus, the method comprising:
    determining a performance preference;
    responsive to the performance preference indicating a preference for decreased power usage:
        automatically selecting a device to move from a first of a plurality of buses to a second of the plurality of buses;
        configuring the device to communicate via the second bus;
    responsive to the performance preference indicating a preference for increased efficiency:
        automatically selecting a device to move from the second of the plurality of buses to the first of the plurality of buses; and
        configuring the device to communicate via the first bus.

11. The computer-implemented method of claim 10 further comprising:
    responsive to the performance preference indicating a preference for decreased power usage:
        configuring each device on the first bus to communicate via the second bus; and
        causing the first bus to become idle.

* * * * *